United States Patent [19]

Dourlain

[11] Patent Number: 5,973,489
[45] Date of Patent: Oct. 26, 1999

[54] EXPANDED INPUT VOLTAGE RANGE FOR SWITCH-MODE POWER SUPPLY IN BROADBAND NETWORK

[75] Inventor: William Dourlain, Manlius, N.Y.

[73] Assignee: Philips Electronics N.A. Corporation, New York, N.Y.

[21] Appl. No.: 09/207,723

[22] Filed: Dec. 8, 1998

[51] Int. Cl.⁶ .................................................. G05F 5/00
[52] U.S. Cl. .................................................... 323/299
[58] Field of Search .................................. 323/282, 285, 323/299, 303; 363/65, 67

[56] References Cited

U.S. PATENT DOCUMENTS

| | | | |
|---|---|---|---|
| 3,860,748 | 1/1975 | Everhart et al. | 178/6 |
| 4,783,846 | 11/1988 | Wachob | 455/151 |
| 5,381,050 | 1/1995 | Siclari et al. | 307/112 |
| 5,436,822 | 7/1995 | West, Jr. | 363/63 |

*Primary Examiner*—Matthew Nguyen
*Attorney, Agent, or Firm*—Michael E. Belk'

[57] ABSTRACT

In a complex AC power distribution network (e.g. CATV), a switching mode power supply at a node, automatically operates in a first mode when the input AC power is at a lower potential and operates in a second mode when the input AC power is at a higher potential. A controller switches between modes of operation depending on the input voltage and on the current mode of operation to proved stable switching between modes which in turn provides stable output voltage from the power supply.

5 Claims, 4 Drawing Sheets

EXPANDED INPUT VOLTAGE RANGE FOR SWITCH-MODE POWER SUPPLY IN BROADBAND NETWORK

FIELD OF THE INVENTION

The inventions relate to complex alternating-current (AC) power distribution systems in which the electrical loads are primarily direct-current (DC) regulated-voltage power supplies provided with input power from the distribution system and in which the AC voltage varies over a wide range (e.g. more than 30%) through the system. The invention also relates to the DC power supplies used in such a system in which AC power is provided over a wide voltage range and more specifically, to a circuit for switching between modes of operation of such power supplies.

BACKGROUND

In modern community antenna television (CATV) distribution networks, there have been recent shifts to multi-redundant centralized powering and to the extension of networks by using fiber optic transmission cables. In order to provide these expanded networks and their power hungry equipment with AC power from a single source, the alternating current voltage in these systems is being increased from the 60 volts to 90 volts. The resulting networks tend to have higher voltage drops along the distribution tree than previous networks. These power distribution systems have been plagued by unstable conditions wherein direct current (DC) power supplies begin drawing increased current and overloading the AC power delivery capabilities of the network. The cause of these instabilities is in the nature of modern DC power supplies.

In an ideal electrical system consisting of a power source and a load, maximum power transfer occurs when the impedance of the load matches the impedance of the power supply. If the load resistance increases then current through the system will decrease and less power will be transferred. If the load resistance decreases then the voltage across the load will decrease and less power will be transferred.

In a CATV system, long conductor distances have significant series resistance so that remote portions of these systems tend to have voltages far below the voltage at the AC power source. Optical cables may extend as far as 60 miles from the head end to nodes and then coaxial cables may extend many more miles from the nodes and/or customer interface units. In addition AC voltage in the system may vary dynamically due to momentary power interruptions, sags, system maintenance, adding new users, activation of various equipment in the system, temporary overloads, or "sheath currents" caused by imbalances in the power distribution system.

In CATV networks, at nodes, signal amplifiers, and user interface units, AC power is converted to DC power by a DC power supply, and the DC power is used to operate various electronic equipment. Switched-mode power supplies (SMPSS) are typically used in these applications because they maintain high conversion efficiency over a reasonable range of input voltage, so that power requirements remain nearly constant within that range.

Unfortunately, this constant power characteristic provokes instability in the AC power distribution network because the input impedance of the DC power supplies is dynamically negative. That is, a decrease in the supply voltage causes an increase in the current demanded by the power supplies which causes increased voltage drop through the distribution system and results in a furthers decrease in the voltage at the input of the DC power supply.

The electronic equipment in the nodes and customer interface units are very sensitive to instabilities and to any out of specification conditions in the DC voltage. Such equipment may fail to operate correctly or may even be damaged by instabilities in the DC power.

In modern switched mode power supplies, when the AC input voltage drops below a minimum level, then the DC output becomes unregulated and unstable, and the current demanded by the power supply increases. The increased current further reduces the input voltage, as described above. Thus, once a DC power supply in one branch of the power distribution network becomes unstable, then other DC power supplies in the branch tend to also become unstable resulting in cascade failures. A large number of CATV cable customers are subjected to service interruption. In addition, the recovery voltage at which an unstable DC power supply regains its stability is significantly higher than the voltage at which it initially became unstable, so that it is difficult to regain stability after DC power supplies in a CATV system become unstable.

Currently, the typical response to instability is to shut down the entire system or at least a portion of the system that can be remotely shut down, and then power distribution is reinitiated in the shut down portion. This solution results in interrupted service to a large number of customers.

Those skilled in the art are directed to the following citations. "Powering Stability in 90 Volt Networks" by Peter Deierlein in 1996 NCTA Technical Papers describes the power distribution system instability problem and suggests that "a latching shutdown function (with delayed restart) is added to the power supplies". U.S. Pat. No. 4,937,731 to Konopka suggests a DC power supply that automatically adapts to operate with AC input of either 120 or 240 Volts. U.S. Pat. No. 4,933,832 to Schneider suggests a DC power supply that automatically adapts to operate with an input voltage of either 100 volts or 120 volts. Those skilled in the art are also directed to "Constant power fusing arrangement for 110/220-volt power supplies" and "Primary controlled automatic line select circuit" in IBM technical discolsure bulletin Vol. 31, No. 6, November 1998

The above citations are hereby incorporated herein in whole by reference.

SUMMARY OF THE INVENTION

In the invention, the DC switch-mode power supply in a CATV system switches between a lower input voltage mode of operation and a higher input voltage mode of operation depending on both the AC input voltage and the existing mode of operation (the current mode). The voltage at which the power supply switches from the high voltage AC mode to the low voltage AC mode is significantly different than the voltage at which the power supply switches from low voltage AC mode to high voltage AC mode of operation. Thus, the switching depends on both the voltage and also on the operating mode prior to switching. The term "significantly lower" means that during operation at the switching voltage, most normal functions in the input voltage are unlikely to switch the power supply immediately back and forth between modes of operation. Thus, the switching depends on both the voltage and also on the operating mode prior to switching. Such a dependence on previous history in systems which are cycling between states is commonly refereed to as hysterisis.

If the power supply always switched at the same mode switching voltage (between the lower and higher input voltage operating modes) regardless of the mode of operation prior to switching between modes, then the power supply would be unstable at that mode switching voltage. Any small fluctuations in the voltage would switch the operating mode. The hysterisis of the power supply mode switching voltage, prevents the power supply from becoming unstable when the input voltage is near the switching voltage.

The two modes allow the power supply to be designed to operate over a wider voltage range of the AC input power. This wider range can be used to allow the DC power supply to operate correctly at lower voltages of AC input power so that the power distribution system can maintain stability with lower AC voltages.

In one aspect of the invention, in the lower input voltage mode, an input conversion circuit converts AC input power into DC input voltage with a potential difference between terminals which is twice the AC RMS voltage. The terminals supply the DC power to other portions of the switching power supply. For example, 35V AC is converted to a 70V difference in DC potential between the two input terminals. In a higher input voltage mode, the input conversion circuit converts the AC input voltage into DC input with the same potential voltage between input terminals as the voltage of the AC power.

DETAILED DESCRIPTION OF PREFERRED EMBODIMENTS AND THE BEST MODE

Figure 1:
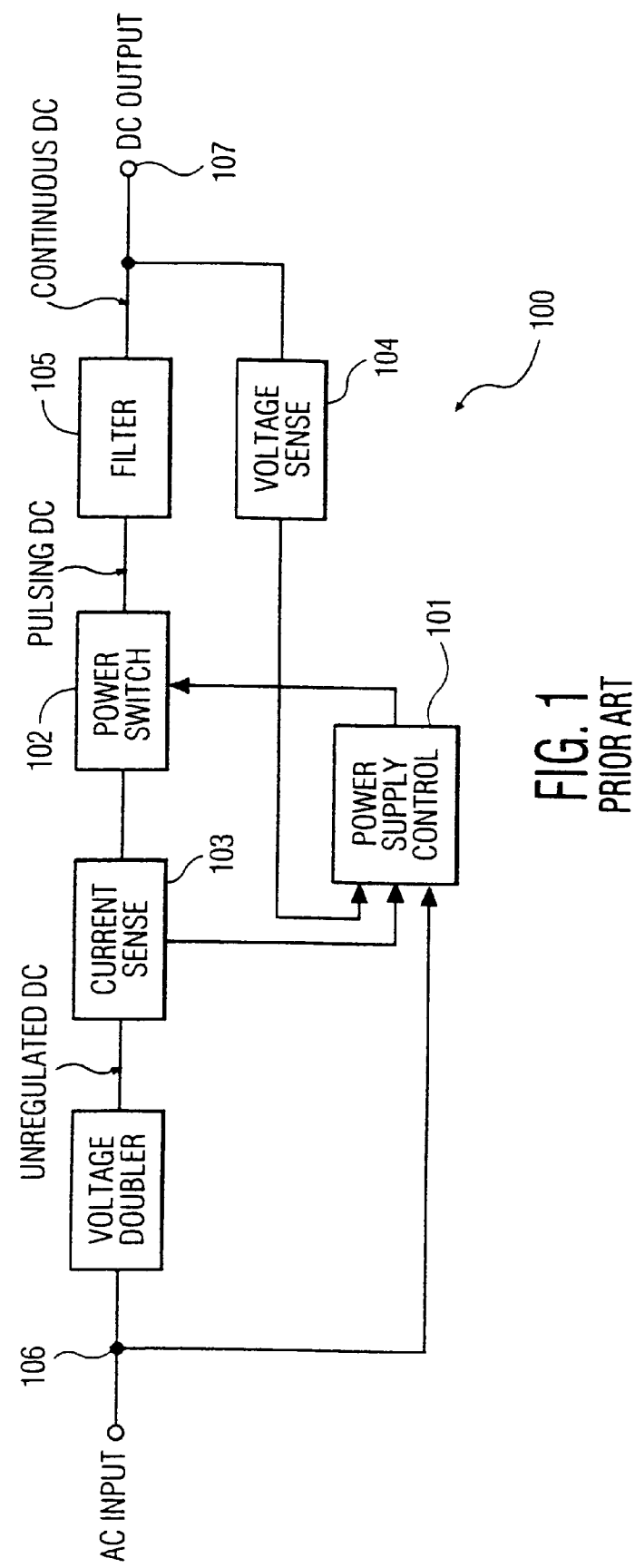
FIG. 1 is a schematic of a DC power supply which does not include the invention.

FIG. 1, illustrates a power supply 100 which does not incorporate the invention. A controller 101 controls the operation of a power switch 102 to convert relatively higher voltage AC input power (at 106) to lower voltage DC output power (at 107) depending on inputs from a current sensor 103 and an output voltage sensor 104. Depending on the signal from the current sensor, the controller limits start-up current based on a signal from the current sense so that the power supply and electronic equipment connected to the power supply are not damaged due to potentially high currents during start-up. The current sensor may be provided anywhere between the AC input and the DC output and on either side of the power switch. Typically, the power supply operates in a switching mode to minimize losses in the power switch. In which case the power switch operates as a high frequency on/off switch depending on a pulse width modulated signal from the controller. Switching mode power supplies generally require a filter 105 in order to provide a continuous (non pulsing) level of voltage at the output. The output voltage sense can be located anywhere after the power switch, but it is preferably positioned after the filter where the output voltage is more stable.

Figure 2:
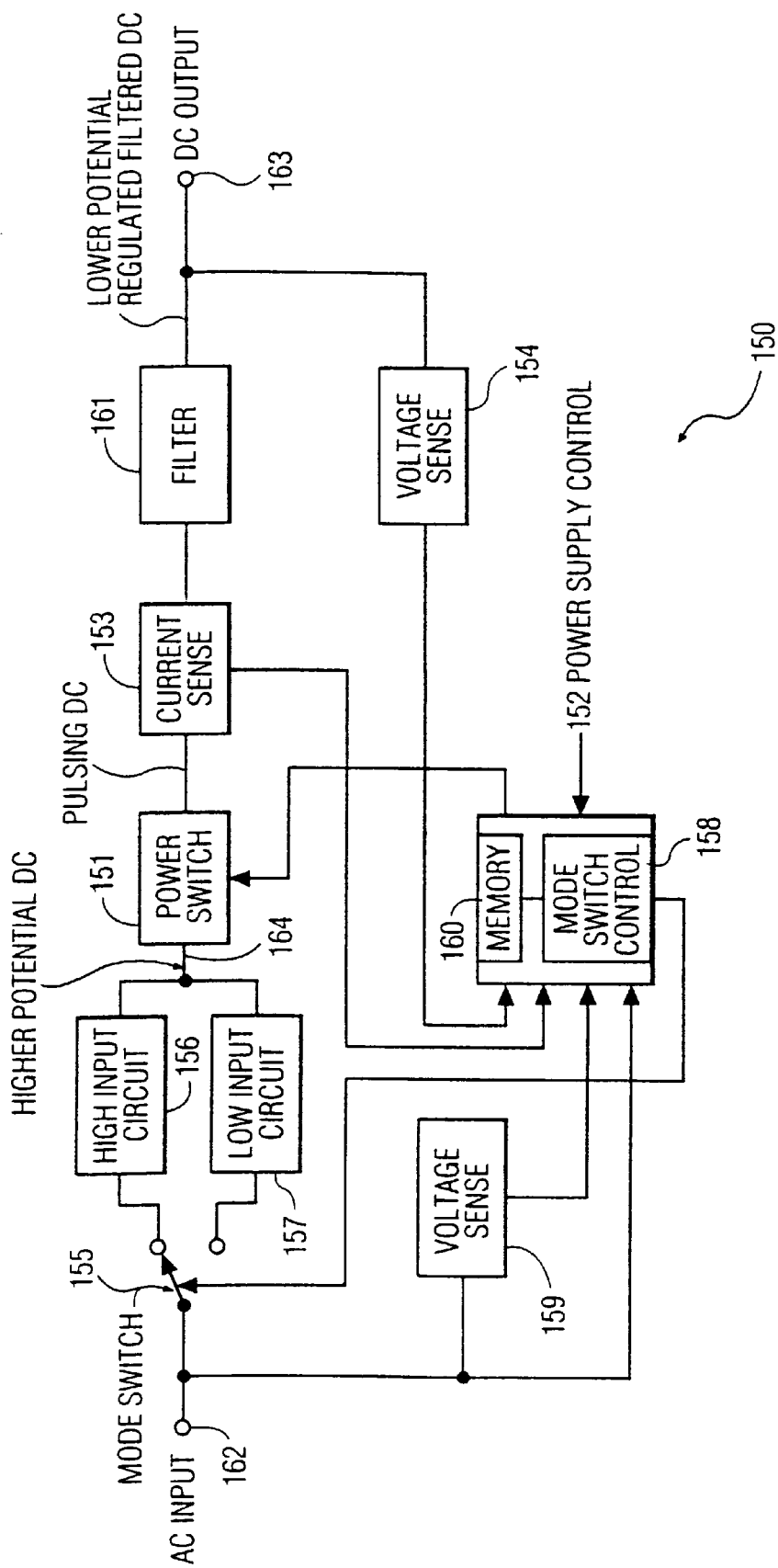
FIG. 2 is a schematic of a specific embodiment of the DC power supply of the invention with an input circuit that switches between a high input voltage and a low input voltage modes of operation.

FIG. 2 shows a specific embodiment of the DC switch-mode power supply 150 of the invention. A power switch 151 is controlled by a power supply control 152 in order to control the flow of current from the higher voltage, DC power input (at 162) to the lower voltage DC power output (at 163) depending on a property of the output power. For a current supply the property would be the current through the power supply measured by current sense 153, and for a voltage supply, the property would be the voltage at the DC power output measured by output voltage sense 154. Mode switch 155 switches between circuit 156 for higher voltage AC input operation and circuit 157 for lower voltage AC input operation. Preferably, lower voltage input circuit 156 includes a voltage doubler circuit that provides rectified DC voltage between output nodes at twice the voltage of the AC input, and circuit 157 simply provides rectified DC voltage between the two nodes at the same voltage as the AC input voltage.

A mode switch control circuit 158 of controller 152, controls the state of mode switch 155 depending on a voltage sense signal from input voltage sense 159 and the current mode signal from memory 160. Memory 160 may be an actual register circuit within the controller or in the alternative, it may be implemented as a multi-state circuit as part of the hardware of the mode switch control.

Figure 3:
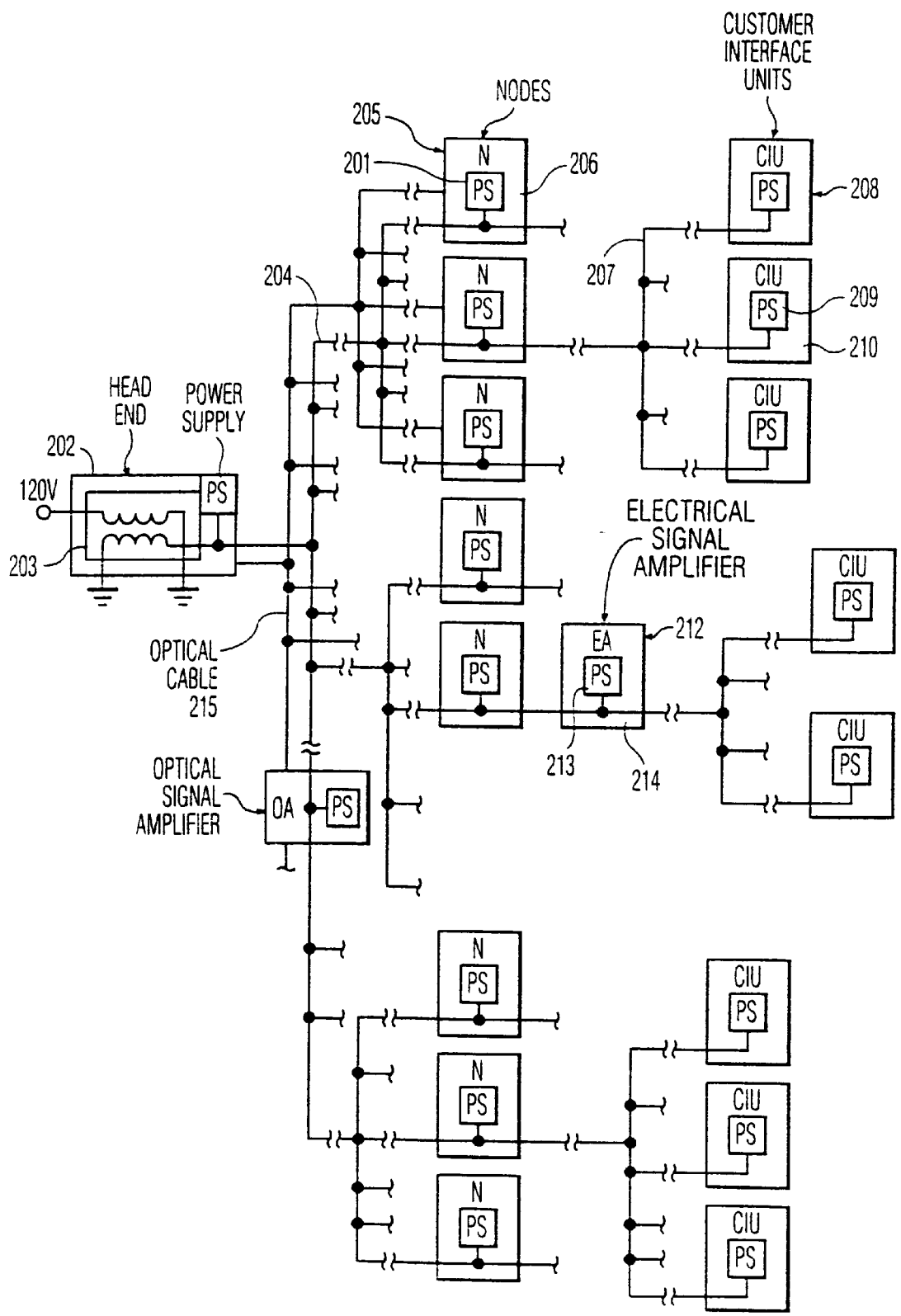
FIG. 3 is a schematic of an AC power distribution system of a CATV system with the duel mode power supply of the invention.

FIG. 3 illustrates an AC power distribution system 200 of a CATV video broadcast system. Many of the components of this system include one or more DC power supplies 201 according to the invention herein and described above with reference to FIG. 2.

At the head end 202 of the CATV system, a central power source 203 includes a step down transformer to provide AC power to the system at 90 volts. The AC power is distributed through a tree 204 of conductors to nodes such as node 205. The nodes include a DC power supply 201 and electronic equipment at 206 which operates using the DC power. A typical system may include hundreds of such nodes, but only a few are shown to simplify the illustration.

In modern cable systems, optical cables 215 extend from the head end to the nodes where the optical information signal is converted to an electrical information signal. Since the optical cables do not conduct electricity, conductive network 204 is required for power distribution. The electronic equipment of the nodes include an optical to electrical transducer and an electrical signal amplifier to provide an electrical signal to a coaxial conductor tree 207 that distributes the electrical signal to customer interface units (CIUs) 208. The nodes also pass the AC power to the coaxial cables to provide electrical power to the CIUs. The CIUs also include DC power supplies 209 and electronic equipment at 210 that utilize the DC power. Only a few coaxial trees are shown in order to simplify the illustration, but typically one or more such trees extends from every node except in systems in which optical cables extend to the homes in which case the nodes 205 might be replaced by user interface units 208. Each node may be connected to several coaxial networks and typically each node services as many as 500 CIUs, but these details are not shown in order to simplify the illustration.

Optical signal amplifiers 220 may be included in the optical network in order to boost the optical signal strength in the optical network in order to extend the region that the CATV system can serve. The optical amplifiers include a DC power supply 221 and electronic equipment 222 for optical signal amplification. In digital networks the optical amplifier may include a processors to correct errors and retransmit a relatively error free optical signal to extend the range of the optical signals.

Electrical signal amplifiers 225 are usually included in the coaxial network in order to boost the signal strength in the coaxial network in order to extend the region that a node can serve. The amplifiers include a DC power supply 226 and electronic equipment 227 for signal amplification.

Figure 4:
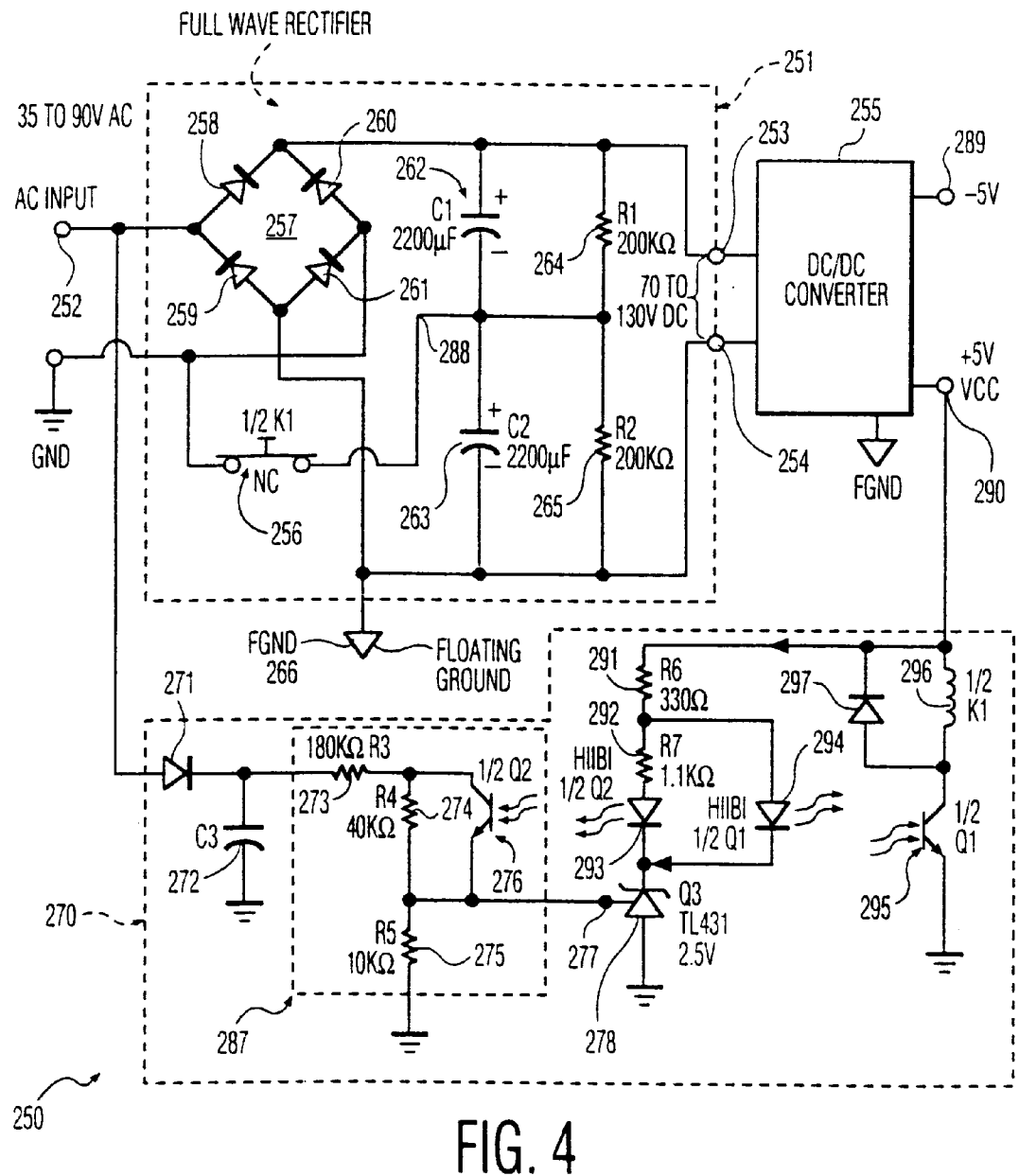
FIG. 4 schematically illustrates a specific hardware embodiment of a switching power supply with the duel mode input circuit of the invention.

FIG. 4 illustrates another example embodiment of the DC power supply 250 of the invention. Input conversion circuit 251 converts AC input voltage at 252 into unregulated DC input voltage between nodes 253 and 254 for other components 255 of the switching power supply. The operating mode of the input circuit depends on the setting of mode switch 256 of a relay K1. The conversion circuit includes full wave rectifier 257 with diodes 258, 259, 260 and 261, and a series pair of capacitors including capacitor 262 (C1) and capacitor 263 (C2). Also, resistor 264 (R1) is in parallel with capacitor C1 and resistor 265 (R2) is in parallel with capacitor C2. The resistors have high resistance so that relatively little current flows through the resistors during operation.

When mode switch 256 is closed as shown, then input conversion circuit 251 operates in a voltage doubling mode for low input voltages. Mode switch 256 is normally closed so the input conversion circuit operates in this voltage doubling mode during start up. In this low input voltage doubling mode, during the positive wave of the AC cycle, current flows from the AC input at 252 through diode 258, through C1, and out through ground. Capacitor C1 is charged up to the maximum value of the AC voltage during the positive wave. During the negative wave of the AC cycle, current flows from ground through capacitor C2, through diode 259, and out to the AC input. Capacitor C2 is charged to the maximum voltage of the negative wave.

When mode switch 256 is open (not as shown), then input conversion circuit 251 operates in a voltage non-doubling mode for higher input voltages. In this high voltage, non-doubling mode the input conversion circuit 251 operates similarly to a common full wave rectifier circuit. During the positive wave of the AC cycle, current flows from the AC input at 252, through diode 258, through C1 and C1, through diode 261, and out to ground. Capacitor C1 and C2 are each charged to ½ the maximum voltage of the positive wave. During the negative wave of the AC cycle, current flows from ground, through diode 260, through capacitor C1 and C2, through diode 259 to AC input 252.

Voltage sense and mode switch control circuit (VSMSC) 270 controls mode switch 256 of relay K1 depending on the input voltage. Diode 271 provided rectified positive DC and capacitor 272 (C3) charges up to hold the maximum input AC voltage. Resistor 273 forms part of voltage divider 287 with resistor 274 (R4) and resistor 275 (R5). The voltage divider controls the voltage at input node 277 of voltage controlled switch 278 (Q3) which switches between open (non-conducting) and closed (conducting) at 2.5V to control the setting of the mode switch as discussed below.

When the mode switch is closed (conducting) (the relay contacts are normally closed) then input conversion circuit 251 operates in a voltage doubling mode for low input voltages and optical transistor 276 of optical relay Q2 is off (non conducting) so that resistors R3 and R4 form one half of a voltage divider and R5 forms the other half of the voltage divider. In this low input voltage mode the voltage divider provides 2.5V when the input voltage reaches approximately 55V so that the circuit remains in the low input voltage mode until the input voltage reaches approximately 65V. Then the voltage reference 278 turns on (conducts) and the mode switch is opened (non-conducting) so that the input conversion circuit operates in a high voltage, non-doubling, full wave rectified mode.

When the mode switch is open (non-conducting) then input conversion circuit 251 operates in a non-doubling high input voltage mode and current flows from the output terminal 290 of the power supply, through resistor 291 (R6), through resister 292 (R7), through light emitting diode (LED) 293 of optical relay Q2 and through LED 294 of optical relay Q1 to close optical switch 276 of optical relay Q2 and close optical switch 295 of optical relay Q1, through voltage regulator 278, and out to ground. Since optical switch 295 is closed (conducting), current flows from output terminal 290, through relay solenoid 296 of relay K1, through optical switch 295 of optical relay Q1 and out into ground. Diode 297 is provided to limit the voltage spike due to the inductance of the solenoid at the input of the optical switch 295 when the switch is not conducting.

In this non-doubling high input voltage mode, since optical switch 276 is closed the input voltage will be divided by a voltage divider consisting of resistor R3 and resister R5 so that at the input 277 of voltage regulator 278 will remain above 2.5V (and the input conversion circuit will continue to operate in the non-doubling mode) until the AC input voltage drops below approximately 55V.

Thus, in this example circuit the input conversion circuit remains in a voltage doubling mode between low AC input voltages up to approximately 65 volts, and then the input conversion circuit operates in a higher voltage non-doubling mode. The input conversion circuit continues to operate in the non-doubling mode for high input voltages until the AC input voltage drops below 55V. Between 55V and 65V the input conversion circuit continuous to operate in same mode it was previously operating in. Therefore as long as system fluctuations are less than approximately 10V then the operating mode of the power supply will remain stable.

The invention has been described with reference to specific embodiments including the best mode for carrying out the invention, and with sufficient detail that anyone skilled in the art can make and use the invention. Those skilled in the art may modify these embodiments or provide other embodiments within the spirit of the invention, and thus, the description does not limit the present invention to the disclosed embodiments. The invention is limited only by the following appended claims.

I claim:

1. An power conversion circuit, comprising:

an input for alternating current electrical power;

an output for rectified direct current power;

first conversion means connected between the input and output, for converting the alternating current power into direct current power at approximately double the voltage of the alternating current power in a first mode of operation;

second conversion means connected between the input and output, for converting the alternating current power into direct current power with approximately the same voltage as the alternating current power in a second mode of operation;

switch means for selecting between the operation of the first and second conversion means; and control means for selecting a mode of operation and controlling the switch means depending on both the voltage of the alternating current power and on the current mode of operation.

2. A switched mode power supply, comprising:

a first power input connection with approximately constant voltage;

a second power input connection for providing alternating current input power to the power supply with alternating high and low potential with respect to the potential of the first power input connection;

a first power output connection;

a second power output connection for providing stable direct current output power with respect to the first power output connection;

a first intermediate node for providing direct current power;

a second intermediate node for providing direct current power with a higher potential than at the first intermediate node;

first circuit means for converting the alternating current input power into direct current at a low potential at the first intermediate node and at a higher potential at the second intermediate node, with a maximum difference in potential between the first and second intermediate nodes substantially greater than the maximum difference in potential between the first and second input power connections;

second circuit means for converting the alternating current input power into direct current at a low potential at the first intermediate node and at a high potential at the second intermediate node, with a maximum difference in potential between the first and second intermediate nodes equal or less than the maximum difference in potential between the alternating current input power connections;

means for switching between operation of the first circuit means and operation of the second circuit means;

control means for regulating the switching, depending on both on the potential of the input power and the state of the switch so that the switch means are switched from operation of the second to the first circuit means at a higher input power potential than the switch means are switched from operation of the first to the second circuit means;

a power switch for regulating an electrical connection between the intermediate nodes and the output connections;

a filter for converting pulsing potential of direct current power at an output of the power switch into approximately continuous output potential; and control means for controlling the power switch depending on the continuous output potential.

3. A cable television network, comprising:

a head end for supplying multimedia programs;

a central source of alternating current power at the head end;

a multitude of nodes remote from the head end, including a DC power supply and electronic equipment operated by direct current power provided by the direct current power supply;

a network tree of optical cable extending from the head end to the nodes;

a network tree of electrical conductors extending from the central source to the nodes;

the DC power supplies including:

a first power input connection with approximately constant voltage;

a second power input connection for providing alternating current (AC) input power to the power supply with alternating high and low potential with respect to the potential of the first power input connection;

a first power output connection;

a second power output connection for providing stable direct current output power with respect to the first power output connection;

a first intermediate node for providing direct current power;

a second intermediate node for providing direct current power with a higher potential than at the first intermediate node;

first circuit means for converting the alternating input power into direct current at a low potential at the first intermediate node and at a higher potential at the second intermediate node, with a maximum difference in potential between the first and second intermediate nodes substantially greater than the maximum difference in potential between the first and second input power connections;

second circuit means for converting the alternating current input power into direct current at a low potential at the first intermediate node and at a high potential at the second intermediate node, with a maximum difference in potential between the first and second intermediate nodes equal or less than the maximum difference in potential between the alternating current input power connections;

means for switching a mode of operation between operation of the first circuit means and operation of the second circuit means;

control means for regulating the switching, depending on both on the potential of the input power and the state of the switch so that the switch means are switched from operation of the second to the first circuit means at a higher input power potential than the switch means are switched from operation of the first to the second circuit means;

a power switch for regulating an electrical connection between the intermediate nodes and the output connections;

a filter for converting pulsing potential of direct current power at an output of the power switch into approximately continuous output potential; and control means for controlling the power switch depending on the continuous output potential.

4. The network of claim 3 in which:

the mode switching means include a switch connected between a third intermediate node and the first power input; and the first and second circuit means include:

a first foreward diode connected between the second power input and the second intermediate node;

a second foreward diode connected between the first intermediate node and the first power input;

a third foreward diode connected between the first intermediate node and the second power input;

a fourth foreward diode connected between the second power input and the second intermediate node;

a first capacitance connected between the first intermediate node and the third intermediate node; and a second capacitance connected between the second intermediate node and the third intermediate node.

5. The network of claim 3 in which the switching control means include:
   a voltage controlled switch connected to control the mode switching means; and
   a switch controlled voltage divider connected to provide a voltage proportional to the peak input AC voltage to control the voltage controlled switch, the proportion depending on the setting of a voltage divider switch which is controlled by the setting of the voltage controlled switch.

* * * * *